(12) United States Patent
Kerzner et al.

(10) Patent No.: US 8,984,274 B1
(45) Date of Patent: Mar. 17, 2015

(54) SECURE DATA UPDATES

(71) Applicant: MicroStrategy Incorporated, Vienna, VA (US)

(72) Inventors: Daniel Kerzner, McLean, VA (US); Terry Berman, Clifton, VA (US); Yi Du, Vienna, VA (US); Shrimohan Damani, South Riding, VA (US)

(73) Assignee: MicroStrategy Incorporated, Vienna, VA (US)

( * ) Notice: Subject to any disclaimer, the term of this patent is extended or adjusted under 35 U.S.C. 154(b) by 27 days.

(21) Appl. No.: 13/916,726

(22) Filed: Jun. 13, 2013

Related U.S. Application Data

(60) Provisional application No. 61/757,935, filed on Jan. 29, 2013.

(51) Int. Cl.
*H04L 29/00* (2006.01)
*H04L 9/08* (2006.01)
*G06F 17/00* (2006.01)
*H04L 9/16* (2006.01)

(52) U.S. Cl.
CPC *H04L 9/08* (2013.01); *G06F 17/60* (2013.01); *H04L 9/16* (2013.01)
USPC .......................................................... 713/150

(58) Field of Classification Search
CPC .............. H04L 9/00; H04L 9/16; G06F 17/60
USPC .......................................................... 713/150
See application file for complete search history.

(56) References Cited

U.S. PATENT DOCUMENTS

| | | | |
|---|---|---|---|
| 6,970,849 B1 * | 11/2005 | DeMello et al. | 705/52 |
| 7,274,792 B2 * | 9/2007 | Chin et al. | 380/262 |
| 7,293,176 B2 * | 11/2007 | Otway et al. | 713/169 |
| 7,299,349 B2 | 11/2007 | Cohen et al. | |
| 7,598,842 B2 | 10/2009 | Landram et al. | |
| 8,634,810 B2 | 1/2014 | Barkie et al. | |
| 2014/0108793 A1 | 4/2014 | Barton et al. | |

\* cited by examiner

*Primary Examiner* — Brandon Hoffman
*Assistant Examiner* — Michael D Anderson
(74) *Attorney, Agent, or Firm* — Fish & Richardson P.C.

(57) ABSTRACT

In one implementation, actions may include generating a first key for encryption of data and a second key for encryption of connection parameters. The connection parameters may enable the client device to establish a connection to an update server. Further actions may include encrypting the connection parameters using the second key and providing the first key and the second key to the update server. Additional actions may include storing the first key on the client device, receiving, at the client device, a notification of an update that includes the second key, decrypting the encrypted connection parameters using the received second key, and connecting to the update server using the decrypted connection parameters. Actions may further include providing a request for the update to the update server, receiving data encrypted using the first key in response, and decrypting the encrypted data using the first key.

15 Claims, 4 Drawing Sheets

SECURE DATA UPDATES

CROSS-REFERENCE TO RELATED APPLICATION

This application claims priority from U.S. Provisional Application No. 61/757,935, filed Jan. 29, 2013, and titled "SECURE DATA UPDATES," which is incorporated by reference in its entirety.

TECHNICAL FIELD

This specification generally relates to secure data updates.

BACKGROUND

Data may be transmitted from a server to a client device.

SUMMARY

In general, one aspect of the subject matter described in this specification may include the actions of generating, at a client device, a first key for encryption of data and a second key for encryption of connection parameters. The connection parameters may enable the client device to establish a connection to an update server. Further actions may include encrypting, at the client device, the connection parameters using the second key and providing the first key and the second key to the update server. Additional actions may include storing the first key on the client device and receiving, at the client device, a notification of an update, the notification including the second key. The actions may also include decrypting, at the client device, the encrypted connection parameters using the received second key and connecting to the update server using the decrypted connection parameters. Actions may further include providing a request for the update to the update server and receiving, at the client device, data encrypted using the first key in response to providing the request to the update server. Lastly, the actions may include decrypting, at the client device, the encrypted data using the first key.

In some implementations, receiving the notification of the update including the second key may include enabling the client device to access another copy of the second key after the client device is prevented from accessing the second key, where the client device is prevented from accessing the second key after the client device provides the second key to the update server and before receiving the notification of the update.

In some implementations, storing the first key may include storing the first key as data that is not accessible while the client device is in a locked mode and decrypting the encrypted data may include decrypting the encrypted data after the client device exits the locked mode.

In some implementations, receiving the notification of the update may include receiving the notification of the update from a notification server that is different from the update server.

In some implementations, encrypting the connection parameters may include encrypting connection parameters including a uniform resource locator (URL) address for the update server and credentials for the client device to receive authorization to access the update server.

In general, one aspect of the subject matter described in this specification may include the actions of receiving, at a server from a client device, a first key for encryption of data and a second key used to encrypt connection parameters on the client device. The actions may further include generating, at the server, an update by encrypting the data using the first key and providing a notification of the update, the notification including the second key and receiving, at the server, a request for the update, the request being based on the connection parameters decrypted using the provided second key. Additional actions may include providing the update to the client device in response to receiving the request.

In some implementations, providing the notification of the update may include providing the notification to a notification server. The notification server may provide a notification to the client device in response to receiving the notification from the notification server.

In some implementations, the actions may further include associating the first key and the second key with the client device.

In some implementations, generating the update may include identifying the client device as a recipient of the update, identifying the first key based on the association to the client device, and encrypting the update data using the identified first key.

In some implementations, providing the notification of the update may include identifying the client device as a recipient of the update, identifying the second key based on the association to the client device, and including the identified second key in the notification.

In some implementations, the actions may further include, in response to receiving the second key, providing an acknowledgement of receipt of the second key to the client device causing the client device to remove the second key from the client device.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Figure 1:
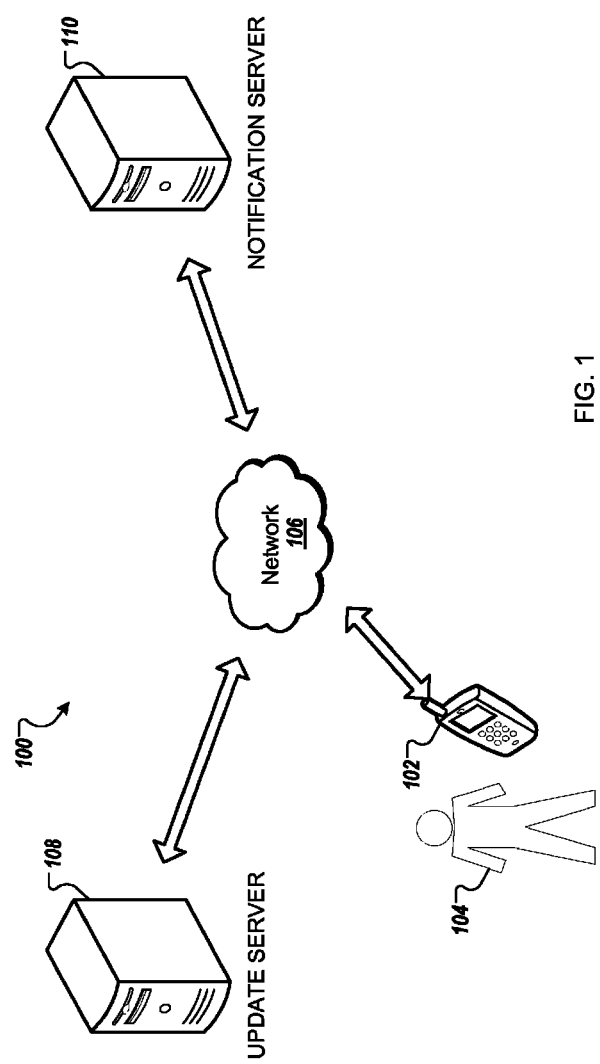
FIG. 1 is an illustration of an example system for transmitting data between an update server and a client device using a notification server.

FIG. 1 shows an example system 100 for transmitting data between an update server 108 and a client device 102 involving a notification server 110. The system 100 may be configured so that the client device 102 may receive data for updates even in situations when the client device 102 is unable to access certain capabilities of the client device 102 that otherwise may be available to the client device 102. For example, the client device 102 may be unable to access such capabilities of the client device 102 due to restrictions imposed by an operating system and/or hardware at the client device 102, but, as described in greater detail below, certain techniques (e.g., performed at an application layer of the client device 102) nevertheless may enable the client device 102 to receive the data for updates.

The client device 102 may include, for example, a mobile computing device, like a smart phone or tablet or laptop computer, or another computing device, like a desktop computer. The client device 102 may access and receive data from the update server 108 that includes, among other data types, documents, spreadsheets, text, images, videos, or program code. The data may be sensitive information that is stored in a secure fashion. To limit access to the data, the client device 102 may encrypt the data before storing the data in a non-transitory storage of the client device 102. For example, the client device 102 may use hardware encryption techniques to store application data for an application in an encrypted form and to store the application in an encrypted form. The user 104 may use the client device 102 to access data on the client device 102. For example, the user 104 may utilize an installed application on the client device 102 to sort and analyze the data.

In some implementations, the client device 102 may be configured (e.g., by an operating system on the client device 102) so that access to the data on the client device 102 may not be granted until a user 104 of the client device 102 is authenticated and authorization of the user 104 to access the data is verified. For example, the user 104 may provide user authentication information (e.g., a user name and/or a password) to authenticate the user's identity. The client device 102 may verify the identity of the user 104 and verify the identified user has authorization to access the data. In such implementations, when the client device 102 requires user authentication before the client device 102 may be used, the client device 102 may be considered to be in a locked mode. Once the client device 102 authenticates the user, the client device 102 may be considered to be in an unlocked mode. In such implementations, the user may be able to access data stored at the client device 102 without further verification when the client device 102 is in the unlocked mode, at least insofar as an operating system on the client device 102 is concerned, for example.

As discussed above, the client device 102 may employ hardware encryption techniques. In some implementations, when the client device 102 is in the locked mode, client device 102 may employ these hardware encryption techniques such that virtually all information, e.g., applications or application data, (or some portion of the information) stored on non-transitory media of the client device 102 may be inaccessible due to the hardware encryption. However, after authenticating a user and transitioning from the locked mode to the unlocked mode, the client device 102 may enable access to all or some portion of such information stored on the non-transitory storage media of the client device 102, at least insofar as an operating system on the client device 102 is concerned, for example.

The client device 102 may enable the user 104 to place the client device 102 into the locked mode. For example, when the user 104 wishes to lock the client device 102, the user 104 may manually place the client device 102 in the locked mode. Additionally, or alternatively, the client device 102 may automatically place the client device 102 into the locked mode if the user 104 does not interact with the client device 102 for more than a predetermined length of time. For example, the client device 102 may enter the locked mode if the client device 102 is unused for five minutes.

The client device 102 may receive data from the update server 108 in the form of automatic updates (e.g., updates not triggered directly in response to requests for updates from a user 104 of client device 102; or updates triggered by an entity other than user 104 of client device or client device 102 itself, for instance, updates triggered by update server 108). Such automatic updates may include new data and/or revised data. Furthermore, different applications may be installed on the client device 102, and the updates may be specific to individual applications. For example, an application for some form of periodic media (e.g., a daily newspaper) might receive daily updates. Similarly, a business intelligence application for a company employee might receive new data updates (e.g., new sales data, new inventory data, etc.) on a daily basis. In some implementations, the automatic updates may be timed to occur at "off" hours when costs associated with the updates may be minimized, e.g., in the middle of the night.

The client device 102 may receive updated data from the update server 108 both in the form of automatic data updates and data updates that are responsive to a request by the client device 102 for updated data from the update server. As part of receiving data from the update server 108, the client device 102 may establish a connection with the update server 108.

The client device 102 may establish a connection with the update server 108 using connection parameters, for example, that are stored on non-transitory media of the client device 102. The connection parameters may be specific to the update server 108, and the update server 108 may be specific to an application installed on the client device 102. The connection parameters may include a uniform resource identifier (URI) (e.g., a uniform resource locator (URL) and/or a uniform resource name (URN)) or other network address of the update server 108, credentials for the user 104, and/or credentials for the client device 102. The credentials may include a user name and password, a digital certificate validating identity or authorization, and/or a unique identifier, e.g., International Mobile Equipment Identifier (IMEI). The client device 102 may use secure Transport Layer Security (TLS) or Secure Socket Layer (SSL) to establish a secure Hypertext Transfer Protocol Secure (HTTPS) connection to the update server 108 using the connection parameters.

The client device 102 may encrypt the connection parameters stored at the client device 102 using a key. In some implementations, the client device 102 may store this key in a storage container configured to store encryption keys, login information (e.g., usernames, passwords, etc.), and the like (e.g., a keychain container) in non-transitory storage media of the client device 102. In such implementations, the client device 102 may regulate access by applications and/or users to this storage container. For example, the client device 102 may regulate access by applications to this storage container such that any particular application only may access data stored in the storage container that is associated with the particular application. In implementations in which the connection parameters are specific to the update server 108 and the update server 108 is specific to a particular application installed on the client device 102, the key used to encrypt the connection parameters may be specific to the particular application. Consequently, the client device 102 may regulate access to the key used to encrypt the connection parameters such that only the particular application may access the key from the storage container.

Additionally or alternatively, the client device 102 may regulate the ability of applications installed on the client device 102 to access data stored in the storage container based on privileges associated with the applications by the client device 102. The client device 102 may associate different privileges with different applications, and the privileges that the client device 102 associates with a particular application may be based on the current state of operation of the particular application at the client device 102. For example, the client device 102 may associate privileges with a particular application that allow the particular application to access data stored in the storage container that is associated with the particular application when the particular application is in active operation on the client device 102 (e.g., executing in the foreground on client device 102). However, when the particular application is not in active operation on the client device 102 (e.g., the particular application is not executing on the client device 102, the particular application is executing in the background on the client device 102, or the client device 102 is in the locked mode), the permissions associated with the particular application by the client device 102 may not enable the particular application to access data stored in the storage container.

In some implementations, the client device 102 may use hardware encryption techniques to prevent access to data stored in the storage container. For example, when the client device 102 is in locked mode, the client device 102 may employ hardware encryption to prevent access to all (or some portion of all) of the data stored in the storage container. Preventing access to data stored in the storage container (e.g., the key used to encrypt the connection parameters) while the client device 102 is in a locked mode may prevent an unauthorized person with physical possession of the client device 102, e.g., a thief, from accessing data stored in the storage container (e.g., the key used to encrypt the connection parameters).

The client device 102 also may use hardware encryption to prevent a particular application installed on the client device 102 from accessing data stored in the storage container when the particular application is not associated with the appropriate privilege(s) for accessing data stored in the storage container. Additionally or alternatively, the client device 102 may use hardware encryption to prevent one application installed on the client device 102 from accessing data stored in the storage container that is associated with another application installed on the client device. Preventing applications from accessing data stored in the storage container in this manner may prevent one application currently executing on the client device 102, e.g., a virus, from accessing data stored in the storage container that is associated with another application (e.g., the key used to encrypt the connection parameters).

The system 100 may be configured so that the client device 102 may receive updates in a variety of different manners. For example, when the client device 102 is in an unlocked mode, the user 104 may use an application on the client device 102 to manually request data for that application from the update server 108, and the update server 108 may provide an update to the client device 102 in response.

In such cases, the client device 102 may access the key for decrypting the connection parameters associated with the application (e.g., from the secure storage container on the client device, which may be accessible while the client device 102 is in an unlocked mode and the client device 102 has associated the appropriate privilege(s) with the application) and use the key to decrypt the connection parameters in order to establish a connection with the update server 108. When the client device 102 receives the updated data from the update server 108, the client device 102 may store the updated data in non-transitory storage media at the client device 102. Depending on the privilege(s) that the client device 102 has associated with the application at this point, the client device 102 may enable the application to take advantage of the hardware encryption functionality of the client device 102 to store the updated data in an encrypted manner.

The system 100 also may be configured to enable the client device 102 to receive automatic data updates associated with an application installed on the client device 102 even when the privilege(s) associated with the application by the client device 102 do not enable the application to access data stored in the storage container and/or to access the hardware encryption functionality of the client device 102 (e.g., when the client device 102 is in the locked mode and/or the application to which the update corresponds is not executing on the client device 102 or is executing in the background on the client device 102). For example, as described in greater detail below, the update server 108 may initiate an automatic data update, and the client device 102 may be able to participate in the data update process even if the client device 102 is unable to access the key for decrypting the connection parameters for establishing a connection with the update server 108. Additionally or alternatively, the client device 102 may be able to store updated data received in such an automatic update process in an encrypted manner even if the client device 102 is unable to encrypt the updated data itself.

The ability for the client device 102 to receive automatic data updates under these circumstances may allow the client device 102 to have updated data ready for the user 104 to access when the user 104 unlocks the client device 102 and/or begins using the application associated with the updated data without requiring the user 104 to wait for the client device 102 to receive the updated data after the user 104 unlocks the client device 102 or begins using the application and/or without requiring the user 104 to manually request updated data from the update server 108.

The client device 102, the update server 108, and the notification server 110 may be connected to a network 106. The network 106 may be a local area network ("LAN") or a wide area network ("WAN"), e.g., the Internet. The client device 102 may be in communication with the update server 108 and/or the notification server 110 over the network. The client device 102 and the update server 108 may communicate information for the client device 102 to receive updates from the update server 108. For example, the client device 102 may send a request for the update to the update server 108. The update server 108 and the notification server 110 may also communicate over the network 106.

The client device 102 and the notification server 110 may also communicate so that the client device 102 receives updates from the update server 108. For example, the update server 108 may notify the notification server 110 that a data update is available for the client device 102 at the update server 108. In response, the notification server 110 may notify the client device 102 that the data update is available for the client device 102 at the update server 108. The notification received by the client device 102 from the update server 108 may include information identifying the update server 108 and/or information identifying the client device 102 to receive the notification of the update. Additionally or alternatively, the notification received by the client device 102 may identify the data that will be updated by the update and/or the application on the client device 102 to which the data to be updated by the update corresponds.

The update server 108 may be any suitable computer or collection of computers executing software capable of providing updates to the client device 102. The update server 108 may generate an update using data. Among other examples, the data may include data for an application for some form of periodic media or for a business intelligence application. For example, the data may be a new edition of a magazine. Additionally or alternatively, the data may be new data related to a business intelligence dashboard, report, or the like.

In some implementations, the update server 108 may receive revised data from another user or computing system, generate updates including the revised data for distribution to client devices that have the earlier unrevised data, and provide the updates to the client devices. As part of providing the updates to the client devices, the update server 108 may also provide a notification of the availability of the updates for the client devices to the notification server 110.

The notification server 110 may be any suitable computer or collection of computers executing software capable of providing notifications to the client device 102. The notification server 110 may receive a notification from the update server 108 that a data update is available for the client device 102 and provide the notification to the client device 102 in response. In some implementations, the notification server 110 may provide the notification to the client device 102 in the form of a push notification. Receipt of the notification at the client device 102 may trigger the client device 102 to send a request for the update identified in the notification to the update server 108. In some implementations, the notification server 110 may be an Apple Newsstand service server using Apple Push Notification Services.

Figure 2:
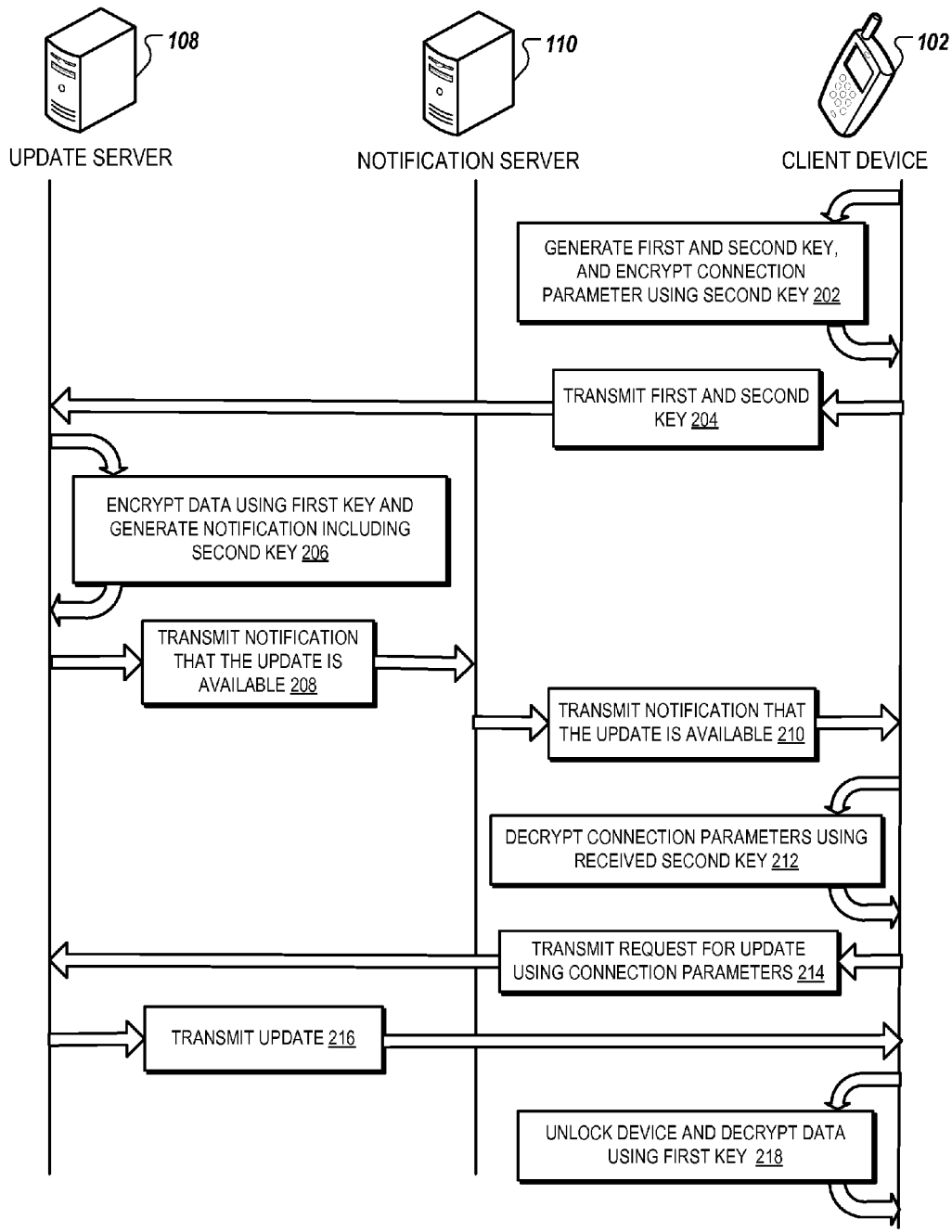
FIG. 2 is a messaging diagram that illustrates examples of messages between an update server, a notification server, and a client device in a system that transmits data between the update server and the client device.

FIG. 2 shows examples of messages between an update server 108, a notification server 110, and a client device 102 in a system that transmits data between the update server 108 and the client device 102. The messaging diagram 200 is described below as being performed using the system 100. However, the messaging diagram may be used in other systems or other configurations of system 100.

The messages described below may be transmitted via any suitable protocol such as, for example, hypertext transfer protocol secure (HTTPS). Additionally, these example messages should not be considered limiting, as any suitable mechanism for performing the functions described could be used, and the messages could be sent or received in any suitable sequence.

As described above, there may be situations in which the client device 102 and/or an application installed on the client device 102 are unable to utilize capabilities of the client device 102 that otherwise may be available to the client device 102 and/or the application in other situations, for example, due to restrictions imposed by an operating system at client device 102. For instance, there may be situations in which the client device 102 and/or an application installed on the client device 102 are unable to access one or more keys for encrypting/decrypting connection parameters for facilitating connections to update server 108 that are stored on the client device 102 (e.g., when the client device 102 is in a locked mode and/or the application lacks the appropriate privileges for accessing the encryption/decryption keys for the connection parameters). Additionally or alternatively, in these situations, the client device 102 and/or the application installed on the client device 102 may be unable to encrypt data (e.g., by taking advantage of hardware encryption capabilities of the client device 102).

In one example, when the client device 102 is in the locked mode, hardware encryption may prevent the client device 102 and/or the application from being able to access the encryption/decryption keys for the connection parameters until the client device 102 is unlocked. Additionally or alternatively, when the client device 102 is in the locked mode, the client device 102 and/or the application may be unable to encrypt data (e.g., by taking advantage of hardware encryption capabilities of the client device 102). In another example, when the client device 102 has not associated the appropriate privileges with the application (e.g., because the application is not executing on the client device 102 or the application is executing in the background on the client device 102), the client device 102 and/or the application may be unable to access the encryption/decryption keys for the connection parameters until the client device 102 associates the appropriate privileges with the application (e.g., responsive to the application initiating execution on the client device 102 or responsive to the application initiating execution in the foreground on the client device 102). Additionally or alternatively, when the client device 102 has not associated the appropriate privileges with the application, the client device 102 and/or the application may be unable to encrypt data.

The messaging diagram 200 illustrates techniques that enable the client device 102 and/or the application installed on the client device 102 to decrypt the connection parameters even when the client device 102 and/or the application are unable to access the encryption/decryption key(s) for the connection parameters stored on the client device 102, for example, due to restrictions imposed by an operating system and/or hardware at the client device 102. The messaging diagram 200 also illustrates techniques that enable the client device 102 and/or the application installed on the client device 102 to store data received in a data update in an encrypted manner even if the client device 102 and/or the application are unable to encrypt data, for example, due to restrictions imposed by an operating system and/or hardware at the client device 102. In the discussion of the messaging diagram 200 that follows, operations that are described as being performed at the client device 102 may be performed by the client device 102, the application installed on the client device 102, and/or a combination of the two.

In step 202, the client device 102 may generate a first key and a second key. The first key may be for encryption of data, e.g., data received in updates. The second key may be for encryption of connection parameters for connecting to the update server 108. The keys may be, for example, 128-bit keys or 256-bit keys. The client device 102 may encrypt the connection parameters using the second key and store the encrypted connection parameters on the client device 102. The keys may be specific to the application and/or the update server 108, respectively. In some implementations, the Advanced Encryption Standard (AES) may be used to encrypt and/or decrypt data using the first key and to encrypt and/or decrypt the encryption parameters using the second key. However, other encryption algorithms also may be used to encrypt and/or decrypt data using the first key and to encrypt and/or decrypt connection parameters using the second key.

In step 204, the client device 102 may transmit the first and second keys to the update server 108. For example, the client device 102 may establish a secure connection with the update server 108 using the URI for the server and/or the credentials in the connection parameters, and transmit the keys using the secure connection. The client device 102 may store the first key in a manner such that, in some situations, the first key may not be accessible. For example, the client device 102 may store the first key such that the first key may not be accessible when the client device 102 is in the locked mode and/or when the client device 102 has not associated the application with the appropriate privileges (e.g., because the application is not executing on the client device 102 or the application is executing in the foreground on the client device 102). The client device 102 may remove the second key from the client device 102 or store the second key in a manner such that, in some situations, the second key may not be accessible. For example, the client device 102 may store the second key such that the second key may not be accessible when the client device 102 is in the locked mode and/or when the client device 102 has not associated the application with the appropriate privileges (e.g., because the application is not executing on the client device 102 or the application is executing in the foreground on the client device 102).

Additionally, in step 204, the update server 108 may receive the first key and second key from the client device 102. The update server 108 may associate the keys with the client device 102 (and/or a user of the client device 102) and store the keys along with the associations. The update server 108 may be specific to a single application or the update server 108 may not be specific to a single application. When the update server 108 is not specific to a single application, the update server 108 may also store an association indicating the application associated with the key. The update server 108 may set an expiration period for the keys. For example, the update server 108 may expire keys after a day, a week, a month, or a year and require the client device 102 to provide new keys if the update server 108 does not have any unexpired keys associated with the client device 102.

While not shown, in response to receiving the second key, the update server 108 may also provide an acknowledgment of receipt of the second key to the client device 102. Receiving the acknowledgement of the receipt from the update server 108 may cause the client device 102 to remove the second key from the client device 102.

In step 206, as described above, in response to (or otherwise associated with) a change in data (e.g., a change in data associated with the client device 102 and/or the user of the client device 102), the update server 108 may generate a corresponding update by encrypting the data using the first key. The update server 108 also may generate a notification of the availability of the update that includes the second key. For example, the update server 108 may generate the update and corresponding notification in response to receiving revised or updated data that corresponds to unrevised data previously provided to the client device 102 and/or in response to receiving new application data that corresponds to an application installed on the client device 102. In generating the update and the corresponding notification, the update server 108 may identify the client device 102 as a recipient of the update. For example, the update server 108 may determine the client device 102 should receive the update as the client device 102 has unchanged data corresponding to the changed data.

The update server 108 may identify the first key based on the stored association with the identified client device 102. For example, the update server 108 may search the stored first keys for the first key that is associated with the determined client device 102. The update server 108 may then generate the update by encrypting the data using the identified first key.

The update server 108 also may identify the second key based on the stored association with the identified client device 102. For example, the update server 108 may search the stored second keys for the second key that is associated with the determined client device 102. The update server 108 may then generate a notification that the update is available. The notification may include a copy of the second key and further include identifications of the client device 102 to receive the notification, the data being updated, the update server 108, and/or an application on the client device 102 to which the update corresponds. In implementations in which the update server 108 is not specific to a single application, the update server 108 may also identify the first and the second keys based on stored associations between applications and corresponding keys and the particular application to which the update corresponds.

In step 208, the update server 108 may transmit the notification to the notification server 110. For example, the update server 108 may establish a secure connection with the notification server 110 and provide the notification to the notification server 110.

In step 210, the notification server 110 may transmit the notification to the client device 102. The notification server 110 may provide the notification to the client device 102 via push notification. The notification server 110 may determine to provide the notification to the client device 102 based on an identification of the client device 120 as a recipient in the notification received from the update server 108. In transmitting the notification, the notification server 110 may forward the original unchanged notification to the client device 102 or the notification server 110 may modify the notification before providing the notification the client device 102.

In providing the notification, the notification server 110 may modify the notification to add, remove, or change information in the notification. For example, the notification server 110 may remove the information identifying the client device 102 from the notification when the notification server 110 sends the notification to the client device 102.

In step 212, the client device 102 may receive the notification. When the client device 102 receives the notification, the client device 102 may be unable to access the first key and/or the second key that were generated by the client device 102. For example, the client device 102 may be in the locked mode when the client device 102 receives the notification, and, consequently, the client device 102 may not be able to access the first key and/or the second key. Alternatively, or additionally, the client device 102 may not currently associate the application to which the update corresponds with the appropriate privilege(s) to enable the client device 102 to access the first key and/or the second key at the time the notification is received (e.g., because the application is not executing on the client device 102 and/or because the application is executing in the background mode on the client device 102). Alternatively, or additionally, the client device 102 may be unable to access the second key as the second key may have been removed from the client device 102 after the second key was transmitted to the update server 108.

Since the client device 102 may be unable to access the second key, including a copy of the second key with the notification of the availability of the update may provide the client device 102 with access to another copy of the second key, thereby enabling the client device 102 to decrypt the connection parameters for connecting to the update server 108 even if the original instance of the second key generated by the client device 102 is not accessible to the client device 102 when the notification is received.

In some implementations, connection parameters for establishing separate connections with multiple different servers may be stored on the client device 102. In such implementations, the client device 102 may determine the appropriate connection parameters to be used to establish a connection with the update server 108 based on information in the notification. For example, the client device 102 may determine the appropriate connection parameters to be used to establish a connection with the update server 108 based on an identification of the update server 108 in the notification, an identification of the application to which the data update corresponds in the notification, and/or an identification of the data to be updated in the notification.

As an example, different connection parameters may be associated with different update servers. The client device 102 may determine the appropriate connection parameters to use based on identifying the connection parameters associated with the appropriate update server 108. The client device 102 may identify the appropriate update server 108 based on information included in the notification (e.g., a particular update server 108 may be identified in the notification). Alternatively, or additionally, the client device 102 may identify the update server 108 based on the application to which the update corresponds and/or the data to be updated. For example, the client device 102 may associate applications with update servers and/or the client device 102 may associate data to be updated with update servers.

After decrypting the connection parameters using the second key provided with the notification of the availability of the update, the client device 102 may use the decrypted connection parameters to establish a connection with the update server 108. Thereafter, in step 214, the client device 102 may transmit a request for the update to the update server 108. For example, the client device 102 may use the decrypted URI corresponding to the update server 108 identified in the notification and/or the decrypted credentials to identify and connect to the update server 108 and request the update identified as being available from the update server 108.

Alternatively, in some situations, the client device 102 may determine not to request the update from the update server 108. For example, in some implementations, in response to receiving the notification that the update is available, the client device 102 may determine if the client device 102 should request the update from the update server 108. In such implementations, this determination may be based on an identification of the data that will be updated by the update included in the notification. If the client device 102 determines that the data already has been updated and/or that the data no longer is used by the client device 102, the client device 102 may determine not to request the update from the update server 108. Consequently, instead of requesting the update from the update server 108, the client device 102 may connect to the update server 108 and notify the update server 108 that the update server 108 does not need to provide the client device 102 the update.

In step 216, the update server 108 may transmit the data encrypted using the first key to the client device 102 in response to receiving the request for the update. For example, the update server 108 may transmit a document encrypted using an AES key and initialization vector to the client device 102 using a HTTPS connection which further encrypts the encrypted document during transmission.

In step 218, the client device 102 may receive the encrypted data. In some situations (e.g., when the client device 102 is in the locked mode and/or the client device 102 has not associated the application to which the data update corresponds with the appropriate privilege(s)), the client device 102 may be unable to encrypt newly received data. For example, as described above, when the client device 102 is in the locked mode or the client device 102 has not associated the appropriate privilege(s) with the application to which the data update corresponds, the client device 102 may not be able to take advantage of the hardware encryption (or other encryption) capabilities of the client device 102 to encrypt the newly received data. Consequently, by encrypting the data in the update using the first key before transmitting the data to the client device 102, the update server 108 enables the client device 102 to store the updated data in an encrypted form even if the client device 102 is unable to encrypt the updated data itself. The client device 102 subsequently may use the first key stored at the client device 102 to decrypt the data.

For example, if the first key is inaccessible to the client device 102 when the encrypted data is received because the client device 102 is in the locked mode (and/or the application to which the data update corresponds lacks the appropriate privilege(s) to access the first key) when the encrypted data is received, when the client device 102 is unlocked (and/or the client device 102 associates the appropriate privileges with the application), the first key again may be made accessible to the client device 102. At this point, the client device 102 then may use the first key to decrypt the encrypted data received from the update server 108. In this manner, the client device 102 may be able to store the updated data in an encrypted manner even if the client device 102 receives the updated data when the client device 102 is in the locked mode (or otherwise unable to encrypt the updated data itself).

Figure 3:
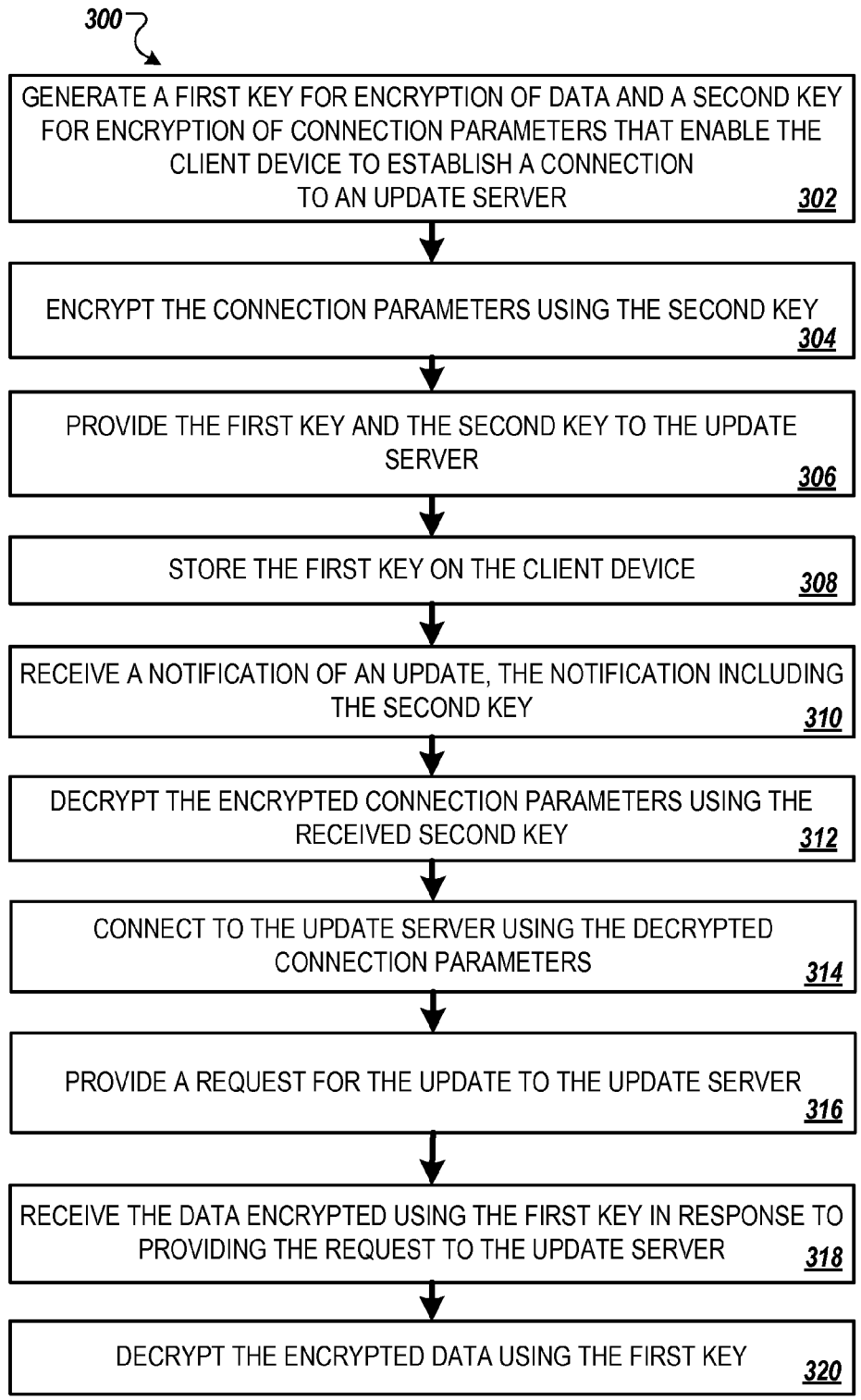
FIGS. 3 and 4 are flowcharts of example processes related to transmitting data from an update server to a client device.

FIG. 3 shows an example process 300 on the client device 102 for transmitting data from the update server 108 to the client device 102. The process 300 is described as being performed using the system 100. However, the process 300 may be performed by other systems, or other configurations of system 100, in any suitable sequence.

The client device 102 may generate a first key for encryption of data and a second key for encryption of connection parameters that enable the client device 102 to establish a connection to the update server 108 (302). For example, client device 102 may perform the key generation described above for step 202 in messaging diagram 200.

The client device 102 may encrypt the connection parameters using the second key (304). For example, the client device 102 may perform the encryption of connection parameters described above for step 202 in messaging diagram 200.

The client device 102 may provide the first key and the second key to the update server 108 (306). For example, the client device 102 may perform the transmission described above for step 204 in messaging diagram 200.

The client device 102 may store the first key on the client device 102 (308). For example, the client device 102 may store the first key as described above for step 204 in messaging diagram 200.

The client device 102 may receive a notification of an update (310). The notification may include a copy of the second key. For example, the client device 102 may receive a notification from the notification server 110 as described above for step 210 in messaging diagram 200.

The client device 102 may decrypt the encrypted connection parameters using the received second key (312). For example, the client device 102 may decrypt the connection parameters as described above for step 212 in messaging diagram 200.

The client device 102 may connect to the update server 108 using the decrypted connection parameters (314). For example, the client device 102 may connect to the update server 108 in transmitting a request for the update as described above for step 214 in messaging diagram 200.

The client device 102 may provide a request for the update to the update server 108 (316). For example, the client device 102 may transmit the request for the update as described above for step 214 in messaging diagram 200.

The client device 102 may receive the data encrypted using the first key in response to providing the request to the update server 108 (318). For example, the client device 102 may receive the encrypted data from the update server 108 as described for step 216 in messaging diagram 200.

The client device 102 may decrypt the encrypted data using the first key (320). For example, a user may unlock the client device 102, which then decrypts the data as described above for step 218 in messaging diagram 200.

Figure 4:
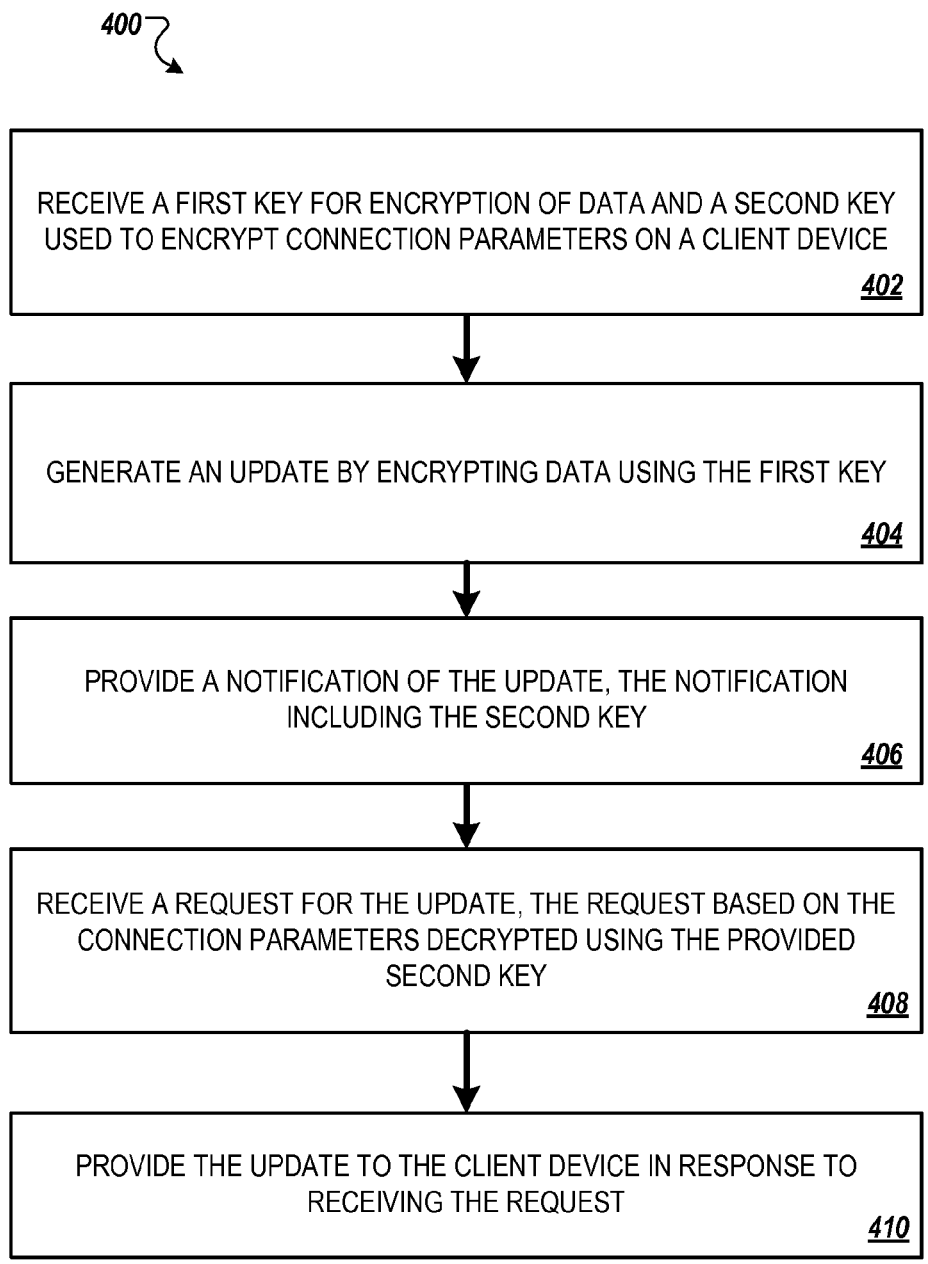

FIG. 4 shows an example process 400 on the update server 108 for transmitting data from the update server 108 to the client device 102. The process 400 is described as being performed using the system 100. However, the process 400 may be performed by other systems, or other configurations of system 100, in any suitable sequence.

The update server 108 may receive a first key for encryption of data and a second key used to encrypt connection parameters on the client device 102 (402). For example, the update server 108 may receive the first and second keys as described above for step 204 in messaging diagram 200.

The update server 108 may generate an update by encrypting data using the first key (404). For example, the update server 108 may encrypt the data as described above for step 206 in messaging diagram 200.

The update server 108 may provide a notification of the update (406). The notification may include the second key. For example, the update server 108 may transmit a notification to the notification server 110 that the update is available as described above for step 208 in messaging diagram 200.

The update server 108 may receive a request for the update (408). The request may be based on the connection parameters decrypted by the client device 102 using the second key provided in the notification. For example, the update server 108 may receive the request for the update as described above for step 214 in messaging diagram 200.

The update server 108 may provide the update to the client device 102 in response to receiving the request (410). For example, the update server 108 may transmit the encrypted data as described above for step 216 in messaging diagram 200.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, throughout the disclosure, the update server 108 and the notification server 110 generally are described as separate entities. However, in some implementations, the update server 108 and the notification server 110 may be implemented as part of a single computing system and/or the update server 108 and the notification server 110 may be implemented as the same computing device. Accordingly, other implementations are within the scope of the following claims.

The invention claimed is:

1. A non-transitory computer-readable medium storing instructions executable by one or more computers which, upon such execution, cause the one or more computers to perform operations comprising:
   generating, at a client device, a first key for encryption of data and a second key for encryption of connection parameters, wherein the connection parameters enable the client device to establish a connection to an update server;
   encrypting, at the client device, the connection parameters using the second key;
   providing the first key and the second key to the update server;
   after providing the first key and the second key to the update server, preventing the client device from accessing the second key until the client device receives a notification of an update that includes the second key;
   storing the first key on the client device;
   receiving, at the client device, the notification of the update, the notification including the second key;
   decrypting, at the client device, the encrypted connection parameters using the received second key;
   connecting to the update server using the decrypted connection parameters;
   providing a request for the update to the update server;

receiving, at the client device, data encrypted using the first key in response to providing the request to the update server; and decrypting, at the client device, the encrypted data using the first key.

2. The medium of claim 1, wherein the operations further comprise:
wherein, storing the first key comprises storing the first key as data that is not accessible while the client device is in a locked mode; and
wherein decrypting the encrypted data comprises decrypting the encrypted data after the client device exits the locked mode.

3. The medium of claim 1, wherein receiving the notification of the update comprises:
receiving the notification of the update from a notification server that is different from the update server.

4. The medium of claim 1, wherein generating the first key and the second key comprises:
generating, for the first key, a first advanced encryption standard (AES) key and a first initialization vector; and
generating, for the second key, a second AES key and a second initialization vector.

5. The medium of claim 1, wherein encrypting the connection parameters comprises:
encrypting connection parameters comprising a uniform resource locator (URL) address for the update server and credentials for the client device to receive authorization to access the update server.

6. A computer-implemented method comprising:
generating, at a client device, a first key for encryption of data and a second key for encryption of connection parameters, wherein the connection parameters enable the client device to establish a connection to an update server;
encrypting, at the client device, the connection parameters using the second key;
providing the first key and the second key to the update server;
after providing the first key and the second key to the update server, preventing the client device from accessing the second key until the client device receives a notification of an update that includes the second key;
storing the first key on the client device;
receiving, at the client device, the notification of the update, the notification including the second key;
decrypting, at the client device, the encrypted connection parameters using the received second key;
connecting to the update server using the decrypted connection parameters;
providing a request for the update to the update server;
receiving, at the client device, data encrypted using the first key in response to providing the request to the update server; and
decrypting, at the client device, the encrypted data using the first key.

7. The method of claim 6, wherein:
storing the first key comprises storing the first key as data that is not accessible while the client device is in a locked mode; and
decrypting the encrypted data comprises decrypting the encrypted data after the client device exits the locked mode.

8. The method of claim 6, wherein receiving the notification of the update comprises:
receiving the notification of the update from a notification server that is different from the update server.

9. A system comprising:
one or more computers and one or more storage devices storing instructions that are operable, when executed by the one or more computers, to cause the one or more computers to perform operations comprising:
generating, at a client device, a first key for encryption of data and a second key for encryption of connection parameters, wherein the connection parameters enable the client device to establish a connection to an update server;
encrypting, at the client device, the connection parameters using the second key;
providing the first key and the second key to the update server;
after providing the first key and the second key to the update server, preventing the client device from accessing the second key until the client device receives a notification of an update that includes the second key;
storing the first key on the client device;
receiving, at the client device, the notification of the update, the notification including the second key;
decrypting, at the client device, the encrypted connection parameters using the received second key;
connecting to the update server using the decrypted connection parameters;
providing a request for the update to the update server;
receiving, at the client device, data encrypted using the first key in response to providing the request to the update server; and
decrypting, at the client device, the encrypted data using the first key.

10. The system of claim 9, wherein:
storing the first key comprises storing the first key as data that is not accessible while the client device is in a locked mode; and
decrypting the encrypted data comprises decrypting the encrypted data after the client device exits the locked mode.

11. The system of claim 9, wherein receiving the notification of the update comprises:
receiving the notification of the update from a notification server that is different from the update server.

12. A non-transitory computer-readable medium storing instructions executable by one or more computers which, upon such execution, cause the one or more computers to perform operations comprising:
generating, at a client device, a first key for encryption of data and a second key for encryption of connection parameters, wherein the connection parameters enable the client device to establish a connection to an update server;
encrypting, at the client device, the connection parameters using the second key;
providing the first key and the second key to the update server;
storing the first key on the client device as data that is not accessible while the client device is in a locked mode;
receiving, at the client device, a notification of an update, the notification including the second key;
decrypting, at the client device, the encrypted connection parameters using the received second key;
connecting to the update server using the decrypted connection parameters;
providing a request for the update to the update server;
receiving, at the client device, data encrypted using the first key in response to providing the request to the update server; and decrypting, at the client device, the encrypted data using the first key after the client device exits the locked mode.

13. The medium of claim 12, wherein receiving the notification of the update comprises:
   receiving the notification of the update from a notification server that is different from the update server.

14. The medium of claim 12, wherein generating the first key and the second key comprises:
   generating, for the first key, a first advanced encryption standard (AES) key and a first initialization vector; and
   generating, for the second key, a second AES key and a second initialization vector.

15. The medium of claim 12, wherein encrypting the connection parameters comprises:
   encrypting connection parameters comprising a uniform resource locator (URL) address for the update server and credentials for the client device to receive authorization to access the update server.

* * * * *